Figure 1:
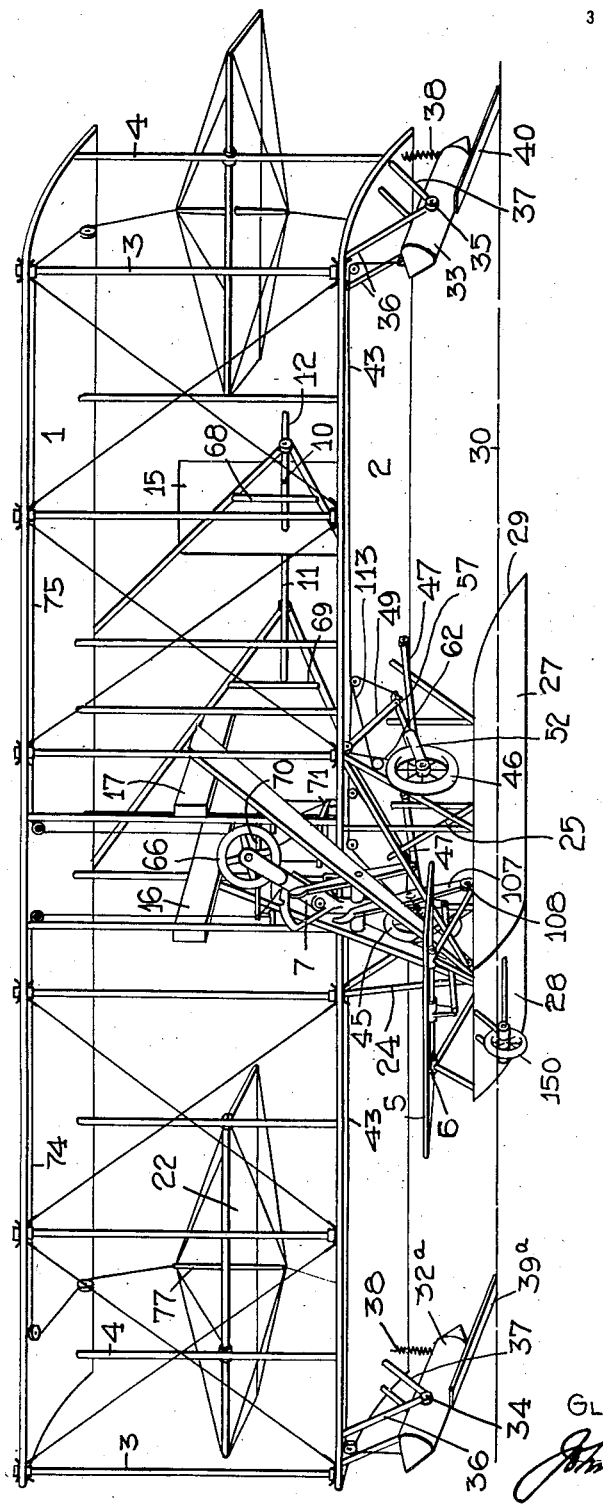

G. H. CURTISS.
CONVERTIBLE RUNNING GEAR.
APPLICATION FILED NOV. 18, 1916.

1,269,570.

Patented June 11, 1918.
3 SHEETS—SHEET 1.

Inventor
GLENN H. CURTISS.

Attorney

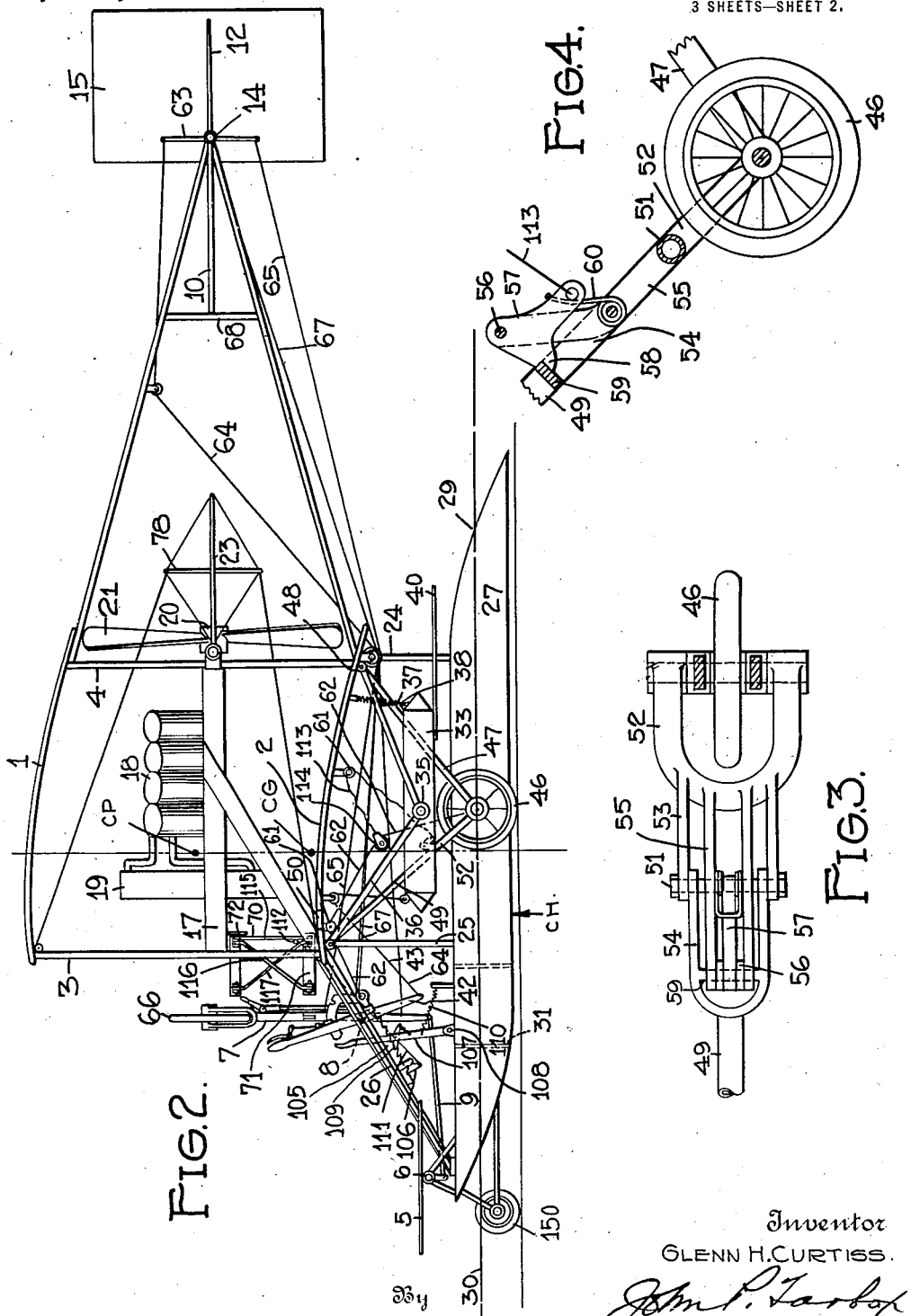

G. H. CURTISS.
CONVERTIBLE RUNNING GEAR.
APPLICATION FILED NOV. 18, 1916.
1,269,570.
Patented June 11, 1918.
3 SHEETS—SHEET 3.
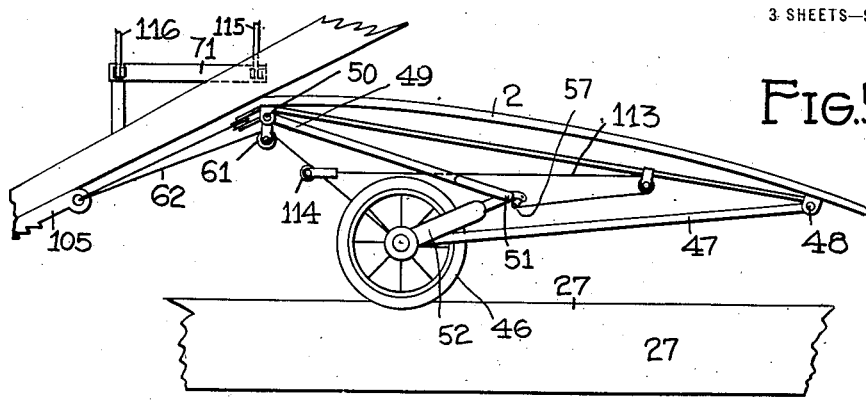
FIG. 5.
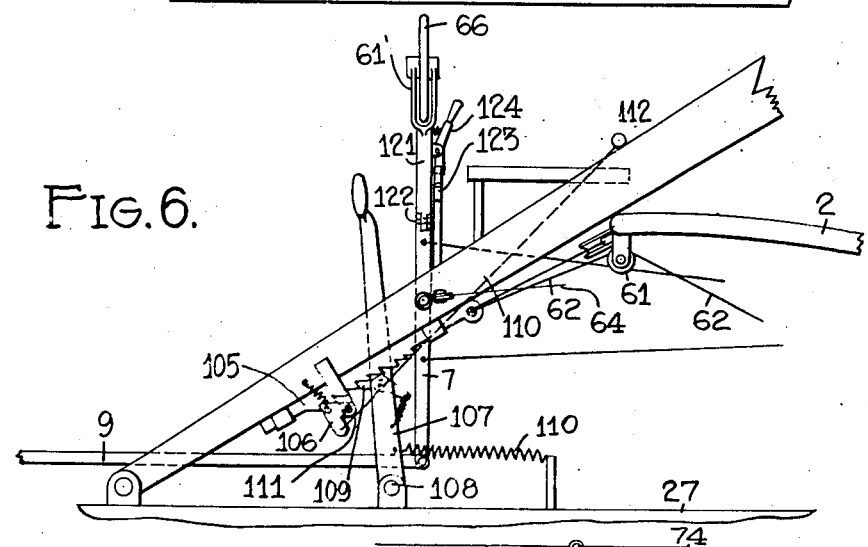
FIG. 6.
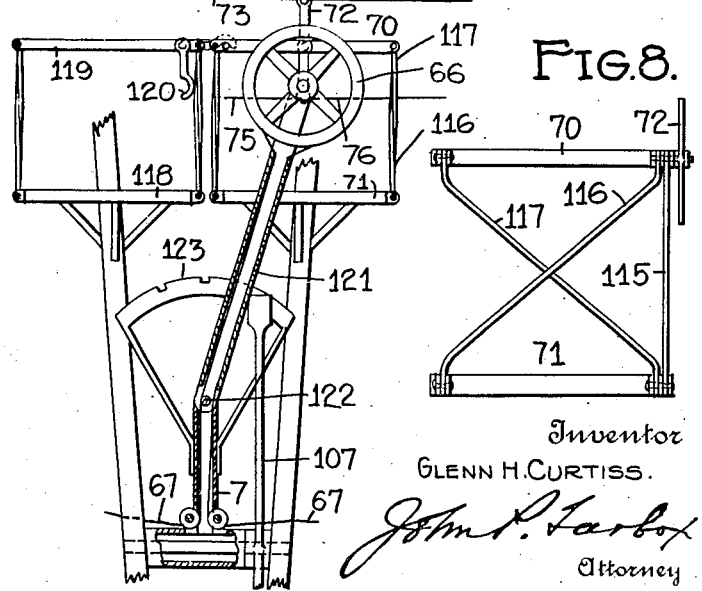
FIG. 7.
FIG. 8.
Inventor
GLENN H. CURTISS.
John P. Tarbox
Attorney

UNITED STATES PATENT OFFICE.

GLENN H. CURTISS, OF BUFFALO, NEW YORK, ASSIGNOR TO CURTISS AEROPLANE AND MOTOR CORPORATION, A CORPORATION OF NEW YORK.

CONVERTIBLE RUNNING-GEAR.

1,269,570.    Specification of Letters Patent.    Patented June 11, 1918.

Original application filed August 22, 1911, Serial No. 645,340. Divided and this application filed November 18, 1916. Serial No. 132,104.

*To all whom it may concern:*

Be it known that I, GLENN H. CURTISS, a citizen of the United States of America, residing at Buffalo, in the county of Erie and State of New York, have invented certain new and useful Improvements in Convertible Running-Gear, of which the following is a specification.

Launching and landing means for an aircraft is the subject of my invention. The invention is directed particularly to a launching and landing means for that type of aircraft commonly known as a hydroaeroplane, but it will be very obvious upon an understanding of my invention that it may be applied with facility to other types of aircraft as well.

This application is a division of my application Serial No. 645,340, filed Aug. 22, 1911, in which there is disclosed a large number of mechanisms and constructions relating to aircraft of the heavier-than-air type.

The prime object of this invention is to attain efficiency in a launching and landing means of the collapsible or folding wheel type. A coördinate object is to attain sturdiness and durability of construction without detracting from the necessary high efficiency. In making efficiency an object I contemplate over-all efficiency, that is, mechanical efficiency, aerodynamic efficiency, and efficiency of manipulation. Many such devices have been proposed; in some of them one of these ends has been attained, and in some, others; but in none, so far as I am aware, have all of them been attained in the degree which is necessary for commercial exploitation.

Broadly speaking, my invention is characterized by a collapsible supporting structure for running gear wheels, constituting the ground running element of a ground landing gear, arranged to be moved from collapsed position either by gravity or by resistance of the medium through which the machine is traveling to extended position, and to be automatically locked in such extended position upon reaching it. No power is therefore required for extending the landing gear to operative position, and but a very minimum of time and attention. The release of a simple detent effects the whole operation in a most efficacious manner. A combined unlocking and retracting mechanism is utilized for effecting the collapse of the running gear. This latter includes a power multiplying device of a step by step nature whereby the running gear wheels may be easily operated at the convenience of the operator.

Such gears, as is well known, have particular application in the case of hydroaeroplanes, the wheels when extended, occupying such position with respect to the water borne base, that the machine may be operated upon land, yet when collapsed occupying a position above the bottom of the water borne base sufficiently to clear the surface of the water when the craft is operated thereover. Certain features of my invention are directed to this combination of the land running gear with the water borne base. Thus certain additional wheels are provided which give the land running gear a stability in spite of the fact that the water borne base is maintained clear of the surface of the ground.

That form of my invention illustrated was that best known to me at the date of filing the parent application above identified but it will be apprehended immediately that other embodiments have been developed by me and by others since that time, and that still others are possible.

Of the drawings,

Figure 1 is a perspective view from the front, parts having been omitted in order not to complicate the drawings, Fig. 2 is a side elevation, Figs. 3, 4, and 5 are details of the folding wheel construction, and Figs. 6 to 8 are enlarged details of the control mechanism.

The features of the aeroplane shown in these drawings are described in detail in my parent application, and inasmuch as they do not enter into this invention, they will be but briefly described.

The aeroplane is of the biplane type comprising upper and lower wings 1 and 2, connected together in the usual fashion. For lateral balance the ailerons 22—23 are operated through the intermediary of a shoulder yoke 70 of the Curtiss type. For longitudinal control there is provided a horizontal stabilizing surface 10 in connection with which are mounted elevators 12. These elevators are operated from the control column 7 which is oscillatable in the longitudinal vertical plane. A vertical rudder 15, movable right and left by rotation of the control wheel 66 at the upper end of the column 7, serves for directional control. The driving thrust is furnished by a propeller 21 operated by a directly connected motor 18.

This aeroplane structure is supported by means of vertically extending struts 24—25 upon a water borne base 27 in the form of a hydroplaning pontoon. The characteristics of this pontoon and its relation to the aeroplane are fully described in my parent application and are at this time fully understood. Between the prow 28 of this pontoon and the elevated motor 18 there are extended a pair of braces 26. These extend respectively from the engine beds 17 at a point intermediate the leading and trailing edges of the aeroplane wings diagonally downward and forward, connecting with the structure of the lower wing at a point in the vicinity of its leading edge and substantially vertically above the vertical struts 25 by means of which the aeroplane is supported upon the pontoon 27. The members 26 are thus spaced apart. They support, in front of the driving motor, both the operator's seat 71 with which is connected the shoulder yoke 70, and the control column 7 and its wheel 66. They also support the control members of the launching and landing means as will hereinafter appear.

45 and 46 are wheels constituting the preferred form of means for supporting the machine in travel in contact with the earth. They are hung from the machine and project slightly below the lower surface of the boat, as indicated in Fig. 2. In order that they may exert less resistance when the machine is moving through the water, I have provided means under the control of the operator for raising the wheels out of the water when the machine is floating, and for depressing the same at will. In the preferred construction, 47 is a brace pivoted at 48 to the frame of the machine, and 49 is another brace pivoted at 50 to the frame, and at 51 pivoted to a short arm 52. A locking device shown in Figs. 3 and 4 in detail, operates to hold the wheels in their depressed position shown in Fig. 1. As shown in Figs. 3, 4 and 5, the wheel is pivoted to the U-shaped frame 52 having projections 53 pivoted to the U-shaped end 54 of the brace 49. Bent arms 55 fixed to the frame 52 carry pivoted to them at 56 a locking detent 57, which has a catch-nose 58 engaging a bar 59 on the U-shaped frame 54. 60 is a spring normally holding the latch in the position shown in Fig. 4. The preferred mechanism for raising the wheels comprises a slidable rack bar 105 (see Figs. 5 and 6) engaged by a spring-pressed detent 106. 62 is a wire connected to the bar and running to the axle of the wheel, being led over suitable pulleys such as 61. 107 is a foot lever pivoted to the boat at 108 and carrying a spring dog 109. 110 is a spring to draw lever 107 backward. As the foot lever is reciprocated it forces the bar 105 downwardly, being held by detent 106 at each reciprocation, drawing on wire 62 and collapsing the frame 47, 49, 52 to the raised position shown in Fig. 5. The holding detent 106 may be tripped by a wire 111 and handle 112 adjacent to the operator's seat. In order to release lock 57 a wire 113 runs therefrom to a pulley 114 loose on the wire 62. This latter is slack when the wheels are down and locked, and as the slack is taken up it draws on wire 113, unlocking latch 57 just before wire 62 becomes taut. Of course the other wheel is provided with the same construction, the wires 62 of both wheels being connected to rack bar 105. Releasing the detent 106 before the machine comes out of the water allows the weight of the parts and the resistance offered by the water to throw the wheels back to the locked position shown in Figs. 1 and 4. The machine may then travel out of the water onto the land and over the same without the resistance which would be exerted by the boat 27 if in contact with the earth. Supported by brackets beneath the fore part of pontoon 27 is still a third wheel 150 as clearly shown in Figs. 1 and 2. With wheels 45 and 46 it constitutes the third point of a triangular wheel base. This wheel as shown is non-collapsible and is preferably considerably smaller than wheels 45 and 46. It is placed at such elevation that when running upon the ground it maintains the fore part of the pontoon elevated above the surface.

The wheels 46, which constitute the main supporting wheels of the machine are so arranged relatively to the water borne base and in fact relatively to the machine in its entirety that the axial line of the wheels, when extended, lies in substantially the transverse vertical plane of the center of gravity and consequently support substantially the entire weight of the machine when at rest upon the ground. The supplemental or third wheel 150 (in effect a runner) is longitudinally separated from the main supporting wheels and so positioned relatively to the machine as to bear only a very minor portion of the total weight thereof and yet sufficient weight to prevent contact of the water borne base with the ground when the machine is operated as a land machine.

In operation, the machine may rise either from the land or water as desired and return thereto. If operating upon the surface of the water with the running gear wheels 45—46 in collapsed condition as shown in Fig. 5, it is desired to run out on to a beach, as the shore is approached the operator releases detent 106 by pulling wire 111 and the wheels are thereby allowed to drop by gravity to the position shown in Fig. 2. First the rush of the air (assuming operation is at high speed) and then the rush of the water, thrusts the wheels rearwardly and downwardly as the machine progresses, thereby aiding gravity in effecting a quick extension. As they move into extended position, they are locked through the automatic action of the spring detent 57 and by virtue of the triangular arrangement of bracing formed by the structure of the lower wing 2 and the struts 47, and 49—52 in combination, and are rigidly and sturdily held in their extended position. As they project slightly below the bottom of the boat, the craft may be run out upon the shore at speed and with the bottom of the water borne base 27 free from contact with the ground. If having started from the land on the wheels as a launching base and having proceeded either into the air or into the water, it is desired to operate upon the surface of the water, the operator has simply to manipulate in oscillating motion the lever 107 as previously described, whereupon the main wheels 45—46 are step by step withdrawn into their retracted or collapsed position in which they are elevated above that level at which they would engage the water and offer material resistance to forward progress. In addition to releasing the latch 57, the cable 113 by virtue of its connection with the collapsing strut 49—52 not only unlocks but assists to break the toggle constituted by the branches 49—52 of the strut. It also takes some of the weight of the gear as it is collapsed depending upon the amount of lost motion which is provided between cable 113 and cable 62.

What I claim is:

1. A launching and landing gear for aircraft comprising a runner, a supporting strut for the runner arranged to be placed under compression and a second collapsible supporting strut for the runner arranged to be placed under tension by rearward thrust, the compression member being located aft of the tension member.

2. A launching and landing gear for aircraft comprising a V-strut frame collapsible in a longitudinal plane, and a runner supported by said frame and movable forwardly and upwardly as the landing gear is collapsed without altering the placement of the points of attachment of either strut relatively to the machine.

3. A collapsible launching and landing gear for air-craft comprising a collapsible runner rigidly braced against collapse rearwardly and arranged to collapse forwardly and upwardly only without altering the placement of the points of attachment of the runner supports relatively to the machine.

4. A launching and landing gear for aircraft comprising a runner, a collapsible triangularly arranged support for the runner, the base of which is immovable relative to the craft, one side of which is fixed longitudinally as respects the craft and the runner, and the other side of which is collapsible to effect collapse of the support.

5. A collapsible launching and landing gear for air-craft comprising a runner, a fixed part of the craft and a pair of meeting struts pivotally connected therewith at points longitudinally spaced, the pivot axes of the struts being relatively stationary, the rearmost one of said struts being longitudinally fixed in length between the runner and the body of the craft and the front strut adjustable to permit movement of the runner with the rearmost strut as a radius.

6. A launching and landing gear for air-craft comprising a collapsible runner having extended and retracted positions, a sectional strut connected with said runner, and step by step operating mechanism connected with said strut for relatively moving its sections.

7. A launching and landing gear for aircraft comprising a collapsible runner arranged for collapse forwardly and upwardly only, means for retracting said runner to collapsed position, and a latch engaging to hold the runner in extended position independently of said retracting means.

8. A launching and landing gear for aircraft comprising a runner, and a collapsible triangularly arranged support therefor, the base of which is immovable relative to the craft, one side of which is fixed longitudinally as respects both the craft and the runner, and the other side of which is longitudinally collapsible to effect the collapse, together with a latch to retain the runner in collapsed position.

9. A launching and landing gear for aircraft comprising a runner, and a collapsible triangularly arranged support therefor, the base of which is immovable relative to the craft, one side of which is fixed longitudinally as respects both the craft and the runner, and the other side of which is foldable to effect the collapse, a latch arranged in connection with said foldable side to hold the same against collapse during operation, and means for retracting the runner.

10. A launching and landing gear for aircraft comprising a collapsible runner, a release latch arranged to hold said runner in collapsed position, and foot operated means for collapsing the runner, aerial controlling means for said craft and hand operated means for said aerial control means.

11. A launching and landing gear for aircraft comprising a runner, and a collapsible framework supporting the same including a toggle, a lock for the toggle arranged to hold the runner in extended position, and operating mechanism to move the runner from extended to retracted position connected with said lock to operate the same and break the toggle.

12. A launching and landing gear for aircraft comprising a collapsible runner which is normally locked against collapse and operating mechanism to move the runner to collapsed position, together with auxiliary operating means to initiate the collapse.

13. A launching and landing gear for aircraft comprising a collapsible runner which is normally locked against collapse, operating mechanism to unlock and move the runner to collapsed position, together with a lost motion connection between said runner and said operating means.

14. A launching and landing gear for hydroaeroplanes including a waterborne base having a downwardly and rearwardly inclined prow, runners mounted respectively at opposite sides of the waterborne base for movement into and out of position beneath the horizontal plane of the bottom of the waterborne base, a fixed runner mounted forwardly of the downwardly and rearwardly inclined prow, a collapsible support for the movable runners and mechanism for controlling the effectiveness of the support.

15. A launching and landing gear for hydroaeroplanes including a pontoon having a downwardly and rearwardly inclined prow, a land runner projected beneath said prow portion together with collapsible runners located rearwardly of said prow runner at opposite sides of the pontoon, both the forward runner and the rear runner, when extended, extending beyond the horizontal plane of the bottom of the pontoon.

16. In a hydro-aero machine, the combination with a water borne base having a construction adapted to support the machine by displacement when at rest on the water and to bring it to a hydroplaning position when traveling at hydroplaning speed thereover, of a pair of laterally spaced main supporting wheel so arranged relatively to the water borne base that they may be extended and retracted respectively below and above the normal water line thereof and so arranged relatively to the machine in its entirety that the axial line of the wheels, when extended, lies in substantially the transverse vertical plane of the center of gravity and they consequently support substantially the entire weight of the machine when at rest upon the ground, said wheels when extended being effective as a means for launching and landing the machine respectively from and upon land, and when retracted, located above the water line so as to interfere in no way with the launching and landing of the machine respectively from and upon water.

17. In a hydro-aero machine, the combination with a water borne base having a construction adapted to support the machine by displacement when the machine is at rest upon the water and to bring it to a hydroplaning position when traveling at hydroplaning speed thereover, of a pair of laterally spaced main supporting wheels so arranged relatively to the water borne base that they may be extended and retracted respectively below and above the normal water line thereof and so arranged relatively to the machine in its entirety that the axial line of the wheels, when extended, lies in substantially the transverse vertical plane of the center of gravity and they consequently support substantially the total weight of the machine when at rest upon the ground, said wheels when extended being effective as a means for launching and landing the machine respectively from and upon land, and when retracted, located above the water line so as to interfere in no way with the launching and landing of the machine respectively from and upon water, and a supplemental runner longitudinally separated from the main wheels and so positioned relatively to the machine as to bear only a very minor portion of the total weight thereof and yet sufficient weight to prevent contact of the water borne base with the ground when the machine is operated as a land machine.

In testimony whereof I affix my signature.

GLENN H. CURTISS.